United States Patent [19]

Wagner et al.

[11] Patent Number: 5,584,921
[45] Date of Patent: Dec. 17, 1996

[54] METHOD FOR THE PREPARATION AND USE OF NEW MIXTURES FOR COATINGS

[75] Inventors: Gebhard Wagner, Odenthal; Karl-Heinz Käsler, Bergisch-Gladbach; Jan Mazanek, Köln; Hans-Heinrich Moretto, Leverkusen, all of Germany

[73] Assignee: Bayer Aktiengesellschaft, Leverkusen, Germany

[21] Appl. No.: 451,852

[22] Filed: May 26, 1995

[30] Foreign Application Priority Data

Jun. 3, 1994 [DE] Germany .......................... 44 19 574.5

[51] Int. Cl.⁶ .............................. C09D 183/06; C09K 3/18
[52] U.S. Cl. ..................... 106/287.1; 106/2; 106/287.13; 106/287.14; 106/287.15; 106/490; 427/387; 427/393.6; 428/703
[58] Field of Search ....................... 106/2, 287.1, 287.12, 106/287.13, 287.14, 287.15, 287.16, 490; 427/387, 393.6; 428/703

[56] References Cited

U.S. PATENT DOCUMENTS

| | | | |
|---|---|---|---|
| 4,124,523 | 11/1978 | Johnson | 106/2 |
| 4,515,884 | 5/1985 | Field et al. | 106/2 |
| 5,356,463 | 10/1994 | Kober et al. | 106/2 |

FOREIGN PATENT DOCUMENTS

| | | | |
|---|---|---|---|
| 550077 | 12/1957 | Canada | 106/2 |
| 0193717 | 1/1986 | European Pat. Off. | |
| 0430156 | 11/1990 | European Pat. Off. | |
| 0518324 | 6/1992 | European Pat. Off. | |
| 2903487 | 8/1979 | Germany | 106/287.13 |
| 62-089765 | 4/1987 | Japan | 106/287.13 |
| 94/09075 | 4/1994 | WIPO | 106/287.13 |

Primary Examiner—Anthony Green
Attorney, Agent, or Firm—Sprung Horn Kramer & Woods

[57] ABSTRACT

Novel mixtures containing at least one polysiloxane and at least one reactive filler, at least one pigment and/or unreactive filler and optionally other additives, their preparation and use in coating. Preferably they are largely free of organic polymers.

8 Claims, No Drawings

METHOD FOR THE PREPARATION AND USE OF NEW MIXTURES FOR COATINGS

The present invention relates to novel mixtures containing at least one polysiloxane, at least one reactive filler, at least one pigment and/or unreactive filler and optionally other additives, and a method for their preparation and use.

Porous mineral substrates, such as building materials made of calcareous sandstone or concrete and facades, plaster and other features, can be protected by various methods against environmental influences.

The coating of building materials and/or of facades with film-forming coatings has in the meantime gained acceptance.

According to prior art these coatings consist in the main of organic polymer dispersions (binders), pigments and fillers and in some cases contain polysiloxanes to improve the water-repellent action.

The endeavors of the construction industry and building materials industry to reduce the proportion of organic polymers or preferably to avoid them entirely and thus to obtain more environmentally acceptable coatings led to the development of silicate paints. These largely inorganic coating systems consist in the main of water-soluble silicates, with which are admixed small quantities of organic polymer dispersions as well as pigments, fillers and optionally, to increase the water-repellent action, polysiloxanes.

Such coating systems have the disadvantage, however, that in the early stage of curing they are not sufficiently resistant to rain and other atmospheric influences such as dirt and/or microorganisms.

The object of the present invention is to provide water-repellent coatings which cure sufficiently at temperatures below 100° C., preferably at room temperature, and contain as small a proportion as possible of organic polymers.

It has been found that mixtures being substantially free of organic polymers comprising
A) at least one polysiloxane,
B) at least one reactive, preferably inorganic filler,
C) at least one pigment and/or unreactive filler, and
D) optionally other additives, such as polymer dispersions, have outstanding properties compared with the prior art.

The present invention therefore provides mixtures substantially free of organic polymers containing at least one polysiloxane, at least one reactive filler, at least one pigment and/or unreactive filler and optionally other additives.

Preferred mixtures according to the invention are characterized in that they consist of
A) from 10 to 60% by weight, preferably 15 to 40% by weight, particularly preferably 25 to 40% by weight, of a polysiloxane or of a mixture of several polysiloxanes,
B) from 5 to 65% by weight, preferably 10 to 50% by weight, particularly preferably 20 to 40% by weight, of a reactive filler or of a mixture of several reactive fillers,
C) from 5 to 80% by weight, preferably 20 to 70% by weight, particularly preferably 30 to 60% by weight, of at least one pigment and/or filler, and
D) from 0 to 30% by weight of another additive or of a mixture of several additives D), with the sum of components A), B), C) and D) being 100% by weight, on a water- and solvent-free basis.

In the mixtures according to the invention the content of D) is preferably at least 0.1% by weight.

In the mixtures according to the invention component A) is preferably at least one hydroxyfunctional and/or alkoxyfunctional polysiloxane, which forms emulsions with water or with other solvents mixed with water. For the purpose of the invention polysiloxanes are, for example, copolymers of polysiloxane and polyester, polyether and/or polyepoxide (or mixtures thereof), as well as linear or branched organopolysiloxanes. Preferably a polysiloxane resin or a mixture of several polysiloxane resins, are used as component A). Particularly preferred are polysiloxane resins which contain a proportion of from 20 to 95% by weight, preferably 40 to 80% by weight, particularly preferably 40 to 60% by weight, of trifunctional structural units of the general formula

wherein
R denotes any organic radical having Si-C bonding, preferably a $C_1$–$C_{14}$ alkyl radical.

Component A) is preferably used as an aqueous emulsion. The use of A) in an organic solvent is also possible and has solely ecological disadvantages.

Component A) can be formed from a mixture of several aqueous emulsions. If component A) is used in the form of an aqueous emulsion, then the siloxane content thereof is between 5 and 80% by weight, preferably between 10 and 70% by weight, particularly preferably between 20 and 60% by weight. Component A) can however optionally contain further solvents in addition to water. Solvents according to the invention are all water miscible and/or water inmiscible solvents used in the paint industry, e.g. glycols, esters, high boiling aromatic and aliphatic solvents etc. Preferably at least one emulsifier and/or one rheological additive, for example, a thickener, may be added. Cationic as well as anionic emulsifiers can be used as emulsifiers. Nonionic emulsifiers are preferred. Component A) in emulsion form can contain emulsifiers, thickeners as well as other auxiliary substances in quantities of from 0.5 to 15% by weight, preferably 1 to 6% by weight, particularly preferably 1.5 to 5% by weight.

Component A) can contain as a further additive from 0 to 5% by weight, preferably 0 to 2% by weight, particularly preferably 0 to 1% by weight, of a bactericide or fungicide. Component A) can consist of either or both pure polysiloxanes and/or oils and be in the form of the corresponding emulsions in water as well as mixed with water and other solvents. Moreover component A) can additionally contain catalysts. The content of catalysts can be up to 1% by weight, based on component A). It is possible to use therefore common condensation catalysts such as, for example, organotin compounds, organotitanium compounds and organoaluminum compounds.

In the mixtures according to the invention, component B) includes all reactive inorganic compounds or inorganic compounds which are modified by organic radicals, which contain reactive groups and which can react with themselves and/or with other components of the mixtures according to the invention. These substances are used preferably in the form of their water-dilutable solutions or emulsions. Some examples of component B) are silica sols, silicate esters, organosiliconates such as, for example, potassium methyl siliconate and/or sodium methyl siliconate, silanes and/or the (partial) hydrolysates thereof, titanate esters, aluminares, zircon aluminates, aluminum hydroxide and organically modified fillers of any kind containing reactive groups within the meaning given above such as, for example, fillers containing epoxy groups, amino groups or unsaturated groups, for instance, quartz, glass, talc, chalk. The term filler also includes materials which, after the reaction according to the invention, are present as solid compounds or reaction products. Thus for example liquid titanate esters, which are incorporated into the coatings, can function as educts, as well as isocyanates, preferably aliphatic isocyanates.

In the mixtures according to the invention the reactive filler B) is preferably colloidal silica in the form of a silica sol, alkyl siliconate, aluminum hydroxide or a mixture of these compounds, a silane and/or the (partial) hydrolysate thereof. The particularly preferred alkyl siliconates are sodium methyl siliconate or potassium methyl siliconate. Here the content of the colloidal silicas is from 5 to 50% by weight of $SiO_2$, preferably from 10 to 40% by weight of $SiO_2$, particularly preferably 15 to 35% by weight of $SiO_2$. Pyrogenic or precipitated silica in powder form and colloidal silica in the form of silica sols are also reactive fillers for the purpose of the invention. The particles of silica sol may also be surface-modified in accordance with known processes. Optionally modified silica sol, which is described in DE-B 2 408 896, U.S. Application No. 2,892,797, U.S. Application No. 2,574,902, U.S. Application No. 2,457,971, U.S. Application No. 2,668,149 and U.S. Application No. 2,650,200, is also preferably used as component B). Silica sols having a particle size of from 5 to 100 nanometers are particularly preferred. Most preferred are those having a particle size of from 10 to 30 nanometers.

In the mixtures according to the invention component C) is an inorganic, organic and/or metallic pigment or filler material or mixtures thereof such as, for example, mica, aluminum oxide, magnesium phosphate and calcium phosphate and/or the carbonates and carbides of magnesium and calcium, nitrides, magnesium oxide, aluminum hydroxide, titanium dioxide, various iron oxides, silicon carbide, zinc oxide, aluminum bronze, tin dust and zinc dust, phthalocyanine blue, various spinels, carbon black, graphite, powdered glass, powdered enamel etc. C) is most preferably at least one inorganic pigment and/or at least one inorganic filler such as, for example, iron oxide, mica and titanium dioxide.

Component D) can be any additive known in the preparation of varnishes and paints, for example, coating additives such as dispersing agents, levelling agents, thickeners, defoaming agents and other auxiliary substances, fungicides, bactericides, stabilizers, inhibitors and catalysts. D) can however also be a polymer or a mixture of several polymers such as, for example, cellulose, polyethers, polyacrylates, polystyrene/poly-acrylates, polyurethanes, softeners as well as various inorganic resins, preferably as water-dilutable dispersions. D) particularly preferably comprises organic polymer dispersions, such as styrene/acrylate or acrylate dispersions.

The mixtures according to the invention can also contain organic, organometallic and/or inorganic corrosion inhibitors such as, for example, phosphoric acid derivatives, various amines, substituted benzotriazoles, nitrosophthalates, substituted phenols, or the like.

The present invention also provides a method for the preparation of the mixtures according to the invention, wherein the individual components A) to C) and optionally D) are stirred together at room temperature. Here the individual components can be mixed together in any order and stirred with one another by known methods until a homogeneous mixture is formed. Thus first of all, for example, there can be prepared mixtures of components A) and B), into which are then mixed aqueous dispersions of component C) and optionally component D), prepared separately or together. It is however also possible to prepare, in the form of dispersions, mixtures of components B) with C) and/or optionally D), which are then mixed with component A). In a preferred embodiment of the present invention, separately prepared individual emulsions and/or dispersions of components A), B), C) or optionally D) are stirred with one another. A particularly preferred method involves stirring components C) and D) to form a dispersion and subsequent stirring with the mixture of components A) and B).

To prepare the dispersions of components B), C) or optionally D), the preferred methods are those employed for the production of coatings, such as ball milling and other homogeneous mixing processes. The use of various auxiliary substances, in particular dispersing agents such as polyacrylic acid derivatives, polyphosphates and phosphonocarboxylic acid derivatives, is preferred in the preparation of these mixtures. Various organic and inorganic binders such as, for example, bentonites, celluloses, polyacrylates or polyurethane thickeners, can be employed to stabilize the coating systems according to the invention and the components thereof and as a safeguard against sedimentation.

The dispersions of the mixtures according to the invention contain from 10 to 90% by weight, preferably 20 to 80% by weight, particularly preferably 30 to 70% by weight, of solids. The aqueous phase can optionally contain organic solvents.

The present invention further provides a method for the production of coatings from the mixtures according to the invention, wherein the mixture is applied to the material to be coated and dried for from 1 to 600 minutes at temperatures of less than 100° C., preferably at room temperature, or else is applied during the production of the substrate to be used, for example, in the production of precast concrete parts. The mixtures are preferably employed in the form of an aqueous dispersion.

The materials to be coated can be almost any porous inorganic materials such as building materials composed of calcareous sandstone, concrete, bricks, gypsum, as well as facades of the most varied composition. Preformed concrete, calcareous sandstone and facades of every kind are particularly preferred. A particularly preferred embodiment of the present invention is the application of the coatings according to the invention to materials during their production, e.g. in the production of concrete roofing slabs, wherein the coating compositions according to the invention are preferably applied in one or two successive stages coordinated with the course of the production.

After drying, the coatings according to the invention are already sufficiently stable to be transported and/or otherwise handled. They can however also be subsequently handled at elevated temperatures, which are accommodated to the respective intended application. Thus, for example, temperatures of 70° C. are preferred in the production of coated concrete roofing slabs. Immediately after drying the coatings according to the invention have a lasting stability to atmospheric influences, pollution and attack by microorganisms.

The coatings according to the invention impart a high water-repellence to the coated material. Owing to the absence or the low proportion of organic components, they are highly acceptable environmentally.

The materials to be coated can be used with or without preparatory treatment, depending upon the nature and purpose of the use. Any preparatory treatment can be carried out by all the known processes, for example radiation treatment.

The mixtures according to the invention are applied to the solid substrate preferably using the techniques of spraying, dipping, rolling and painting. By these means and depending on requirements, coatings can be produced having layer thicknesses of from 5 to 300 μm, preferably of from 10 to 150 μm, particularly preferably of from 15 to 100 μm.

The present invention also extends to the use of the mixtures according to the invention for the coating of building materials and facades and plasterwork of any kind.

The invention is illustrated in the following non-limiting Examples.

EXAMPLES

The following substances are used in the Examples:
I) as polysiloxanes:
Ia) aqueous emulsion of a hydroxyfunctional methyl silicone resin of the average composition $T_{210}D_{23}M_4$ having an average molecular weight of approximately 12,000,
II) as reactive inorganic fillers:
IIa) 30% aqueous colloidal silica suspension having a BET surface of 100 m²/g and a pH value of 10,
IIb) 30% potassium methyl siliconate in water having a methyl silicone content of 16% and a potassium hydroxide content of 14%,
III) as pigments and fillers, liquefiers: see the preparation of the slurries (Table 1).
Example 1
General specification for the preparation of the slurries Enamels, pigments and fillers in the quantities given in Table 1 are introduced into 120 g of water and stirred for approximately 30 minutes at 3000 rev/min using the dissolver (stirrer). Bayhibit S® is then added. The mixture is homogenized at 1800 rev/min for 1 hour.

TABLE 1

Weighed portions of the individual components (parts by weight) for the preparation of the slurries

| Slurry no.<br>Components in parts by weight | 1 | 2 | 3 |
|---|---|---|---|
| Iron oxide red[1] | 59.8 | 29.9 | — |
| Iron oxide black[2] | — | — | 29.9 |
| Chalk[3] | — | 20.9 | 20.9 |
| Talk AT 1[4] | — | 9.0 | 9.0 |
| Bayhibit S[5] | 0.3 | 0.3 | 0 |
| Water | 39.91 | 39.9 | 39.9 |

[1] Bayferrox Red 120 FS, supplier Bayer AG
[2] Bayferrox Black 318 M, supplier Bayer AG
[3] Chalk BLP 2, supplier Omya GmbH
[4] Talc AT 1, supplier Norwegian Talc Minerals AS
[5] Bayhibit S (sodium salt of phosphonotricarboxylic acid) supplier Bayer AG, (dispersing agent)

TABLE 2

Weighed portions of polysiloxane, reactive fillers and slurries for the preparation of mixtures for heat-resistant coatings (data in parts by weight)

| Examples<br>Parts by<br>weight of<br>individual<br>components | 1 | 2 | 3 | 4 | 5 | 6 | 7 | 8 | 9 | 10 | 11 | 12 |
|---|---|---|---|---|---|---|---|---|---|---|---|---|
| Methylpoly | 89.3 | 72.4 | 54.3 | 53.7 | 53.3 | 32.6 | 130.4 | 76.1 | 108.7 | 32.6 | 26.1 | 21.7 |
| Styrene-acrylate dispersion | — | — | — | — | — | — | — | — | — | — | 26.0 | 60.0 |
| Levasil 100 | 59.3 | 111.0 | 83.3 | 82.3 | 81.7 | 133.3 | 116.7 | 200.0 | 16.7 | 50.0 | 83.3 | 66.7 |
| Potassium methyl siliconate | — | — | — | 4.0 | 6.7 | 16.6 | — | — | — | 6.7 | 6.7 | — |
| Slurry 1, 60% | 68.5 | — | — | — | — | — | 8.3 | — | — | — | — | 66.7 |
| Slurry 2, 60% | — | 55.6 | — | 82.3 | 81.7 | — | — | — | 75.0 | 113.3 | 80.0 | — |
| Slurry 3, 60% | — | — | 83.3 | — | — | 71.7 | — | 8.3 | — | — | — | — |

It will be understood that the specification and examples are illustrative but not limitative of the present invention and that other embodiments within the spirit and scope of the invention will suggest themselves to those skilled in the art.

What is claimed is:

1. An aqueous dispersion consisting essentially of water as dispersing means, and
   A) 10 to 60% by weight of at least one polysiloxane,
   B) 5 to 65% by weight of at least one colloidal silica in the form of silica sol,
   C) 5 to 80% by weight of at least one pigment or unreactive filler, and
   D) 0 to 30% by weight of at least one further varnish or paint additive, the sum of components A, B, C and D being 100% by weight on a water- and solvent-free basis.

2. A dispersion according to claim 1, wherein D) is present in at least about 0.1% by weight.

3. A dispersion according to claim 2, wherein D) comprises an organic polymer.

4. A dispersion according to claim 1, wherein D) comprises a levelling agent, thickener, defoaming agent, fungicide, bactericide, stabilizer, inhibitor, catalyst, cellulose, polyether, polyacrylate, polystyrene/poly-acrylate, polyurethane, softener, an inorganic resin, or mixtures thereof.

5. A dispersion according to claim 2, wherein D) comprises styrene/acrylate or an acrylate polymer.

6. A method for the production of a coating, which comprises applying to a material to be coated a dispersion of a composition according to claim 1, and drying the material for at least 1 minute at a temperature less than 100° C.

7. The method according to claim 6, wherein the material to be coated is a precast concrete element, a building material, a facade or plaster.

8. A coated material produced by the process of claim 6.

* * * * *